United States Patent
Hatada et al.

(10) Patent No.: US 9,372,068 B2
(45) Date of Patent: Jun. 21, 2016

(54) MEASURING APPARATUS INCLUDING MULTI-WAVELENGTH INTERFEROMETER

(71) Applicant: CANON KABUSHIKI KAISHA, Tokyo (JP)

(72) Inventors: Akihiro Hatada, Utsunomiya (JP); Yoshiyuki Kuramoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 13/711,289

(22) Filed: Dec. 11, 2012

(65) Prior Publication Data
US 2013/0155414 A1    Jun. 20, 2013

(30) Foreign Application Priority Data
Dec. 15, 2011    (JP) .................................. 2011-275096

(51) Int. Cl.
*G01B 9/02* (2006.01)
*G01B 11/24* (2006.01)

(52) U.S. Cl.
CPC ........ *G01B 9/02096* (2013.01); *G01B 9/02002* (2013.01); *G01B 9/02007* (2013.01); *G01B 9/02027* (2013.01); *G01B 9/02061* (2013.01);
(Continued)

(58) Field of Classification Search
CPC ........... G01B 9/02096; G01B 11/2441; G01B 2290/70; G01B 2290/45; G01B 9/02007; G01B 9/02027; G01B 11/0675
USPC .......................... 356/489, 495, 497, 484, 511
See application file for complete search history.

(56) References Cited

U.S. PATENT DOCUMENTS 5,106,191 A * 4/1992 Ohtsuka ........................ 356/487
5,166,742 A * 11/1992 Kobayashi ............. G01B 9/025
356/35.5

(Continued)

FOREIGN PATENT DOCUMENTS

CN        1384334 A    12/2002
CN      101236067 A    8/2008
(Continued)

OTHER PUBLICATIONS ("Two-Wavelength Single-Shot Interferometry" to Kitagawa et al., SICE annual conference 2007, Japan.*

(Continued)

*Primary Examiner* — Tarifur Chowdhury
*Assistant Examiner* — Mohamed K Amara
(74) *Attorney, Agent, or Firm* — Canon USA Inc., IP Division (57) ABSTRACT

A measuring apparatus for measuring a position or a shape of a surface to be inspected includes a multi-wavelength interferometer and a control unit. The multi-wavelength interferometer includes an optical system that causes light to be inspected, which enters the surface to be inspected and is reflected by the surface to be inspected, and reference light to interfere with each other, a spectroscopic unit that divides interference light between the light to be inspected and the reference light into each wavelength, and a detector that detects the interference light and is provided for each divided interference light and an optical member that can adjust a position of a light guide portion that guides light from the spectroscopic unit to the detector. The control unit controls the optical member by using information related to inclination of the surface to be inspected to adjust the position of the light guide portion.

11 Claims, 6 Drawing Sheets

(52) U.S. Cl.
CPC ........ *G01B 9/02067* (2013.01); *G01B 9/02068* (2013.01); *G01B 9/02082* (2013.01); *G01B 11/2441* (2013.01); *G01B 2290/45* (2013.01); *G01B 2290/50* (2013.01); *G01B 2290/70* (2013.01)

(56) References Cited

U.S. PATENT DOCUMENTS

| | | | | |
|---|---|---|---|---|
| 5,349,440 | A | * | 9/1994 | DeGroot ........................ 356/489 |
| 5,811,826 | A | * | 9/1998 | Shirley .................... G01B 11/26 250/559.29 |
| 5,991,034 | A | | 11/1999 | Ohtsuka |
| 6,906,805 | B1 | * | 6/2005 | Ina ....................... G03F 7/70633 356/497 |
| 8,477,316 | B2 | * | 7/2013 | Holzapfel ............ G01B 9/0207 356/498 |
| 8,896,843 | B2 | * | 11/2014 | Rohner .................... G01B 9/02 356/498 |
| 2006/0061773 | A1 | * | 3/2006 | Lee .................... G01B 11/2441 356/511 |
| 2012/0176625 | A1 | * | 7/2012 | Huntley ............. G01B 11/2441 356/511 |
| 2013/0100458 | A1 | * | 4/2013 | Yamada ........................ 356/489 |

FOREIGN PATENT DOCUMENTS

| | | | |
|---|---|---|---|
| DE | 19524036 A1 | * | 7/1996 |
| JP | 5071918 A | | 3/1993 |
| JP | 10185529 A | | 7/1998 |
| WO | 2011073126 A | | 6/2011 |
| WO | WO 2011134111 A1 | * | 11/2011 ............ G01J 3/0205 |

OTHER PUBLICATIONS

Chap. 37 of "Physics for Scientists and Engineers with Modern Physics", 7th edition by Raymond A. Serway, John W. Jewett, 2007.*
"Two wavelength scanning spot interferometer using single frequency diode lasers", to Den Boef, Appl. Optics, vol. 27, No. 2, pp. 306-311 (1988).*
"Simple multifrequency and phase-shifting fringe-projection system based on two-wavelength lateral shearing interferometry for three-dimensional profilometry" to Mehta et al., Appl. Opt. vol. 44, No. 35, p. 7515 (2005).*
http://isaac.exploratorium.edu/~pauld/summer_institute/summer_day1perception/laser_speckle.html.*
Fercher et al. "Rough surface interferometry with a two-wavelength heterodyne speckle interferometer"; Appl. Opt. 24 (14) 1985, pp. 2181-2188.*
Yamamoto et al. "Profilometry of SlOped Plane Surfaces by Wavelength Scanning Interferometry", Opt. Rev., 9, (3) 2002, pp. 112-121.*
Fercher et al., "Rough-surface interferometry with a two-wavelength heterodyne speckle interferometer", Applied Optics, 1985, pp. 2181-2188, vol. 24, Issue14.
Vry et al.,"High-order statistical properties of speckle fields and their application to rough-surface interferometry", J. Opt. Soc. Am. A, 1986, pp. 988-1000, vol. 3, Issue 7.
Fercher et al.,"Two-Wavelength Speckle Interferometry on Rough Surfaces Using a Mode Hopping Diode Laser", Optics and Lasers in Engineering, 1989, pp. 271-279.

* cited by examiner

WAVELENGTH λ₁ SPECIMEN ANGLE 15°    WAVELENGTH λ₂ SPECIMEN ANGLE 15°

MEASURING APPARATUS INCLUDING MULTI-WAVELENGTH INTERFEROMETER

BACKGROUND OF THE INVENTION

1. Field of the Invention

The present invention relates to a measuring apparatus including a multi-wavelength interferometer.

2. Description of the Related Art

As an apparatus for measuring a shape of a surface to be inspected of an object or goods with a high degree of accuracy, generally, a heterodyne interferometry method is known. In a single wavelength interferometer (see Patent Document 1 (Japanese Patent Laid-Open No. 10-185529)), when a surface to be inspected is rough, a speckle pattern caused by the roughness of the surface has a random phase with a standard deviation greater than $2\pi$, so that uncertainty of measurement increases and an accurate measurement is difficult to be performed.

As a method to solve the above problem, it is described that, in an apparatus that projects laser light to a surface of an object and captures an image of reflected light, incoherent averaging of the random phase of the speckle pattern is performed by changing an aperture position of an imaging lens (see Patent Document 2 (Japanese Patent Laid-Open No. 5-71918)).

As another solving means, a multi-wavelength interferometer is known which synthesizes phases of wavelengths from an interference measurement result of a plurality of different wavelengths (see Non-Patent Document 1 (A. F. Fercher et al., "Rough-surface interferometry with a two-wavelength heterodyne speckle interferometer", Applied Optics, 1985, vol. 24, issue 14, pp 2181-2188)). According to Non-Patent Document 1, if there is a correlation between speckles of two wavelengths, it is possible to obtain information related to a macroscopic surface profile and a microscopic surface roughness on the basis of a phase difference between the two wavelengths.

It is known that a correlation of speckle pattern between two wavelengths depends on a synthesized wavelength of the two wavelengths (see Non-Patent Document 2 (U. Vry, F. Fercher, "High-order statistical properties of speckle fields and their application to rough-surface interferometry", J. Opt. Soc. Am. A, 1986, vol. 3, issue 7, pp 988-1000)). The higher the degree of coincidence of the two speckle patterns, the higher the degree of correlation. According to Non-Patent Document 2, the smaller the synthesized wavelength $\Lambda$, the smaller the correlation of speckle pattern between the two wavelength, and conversely, the greater the synthesized wavelength $\Lambda$, the greater the correlation of speckle pattern between the two wavelength. Here, the synthesized wavelength $\Lambda$ is a value represented by $\Lambda=\lambda_1 \times \lambda_2/(\lambda_1-\lambda_2)$ when the two wavelengths are $\lambda_1$ and $\lambda_2$ ($\lambda_1 > \lambda_2$). In this way, the multi-wavelength interferometer can accurately measure a rough surface to be inspected, which is difficult to measure by the single wavelength interferometer.

According to Non-Patent Document 2, the correlation of speckle pattern between two wavelengths depends on a size of synthesized wavelength as well as roughness of the surface to be inspected and inclination of the surface to be inspected (see Formula 1).

$$\mu = \exp\left(\frac{4\pi i}{\Lambda}h_0\right) \times \exp\left[-\frac{4\pi^2}{\Lambda^2}(2\sigma_h^2 + s^2 a^2)\right] \quad \text{Formula 1}$$

Figure 1:
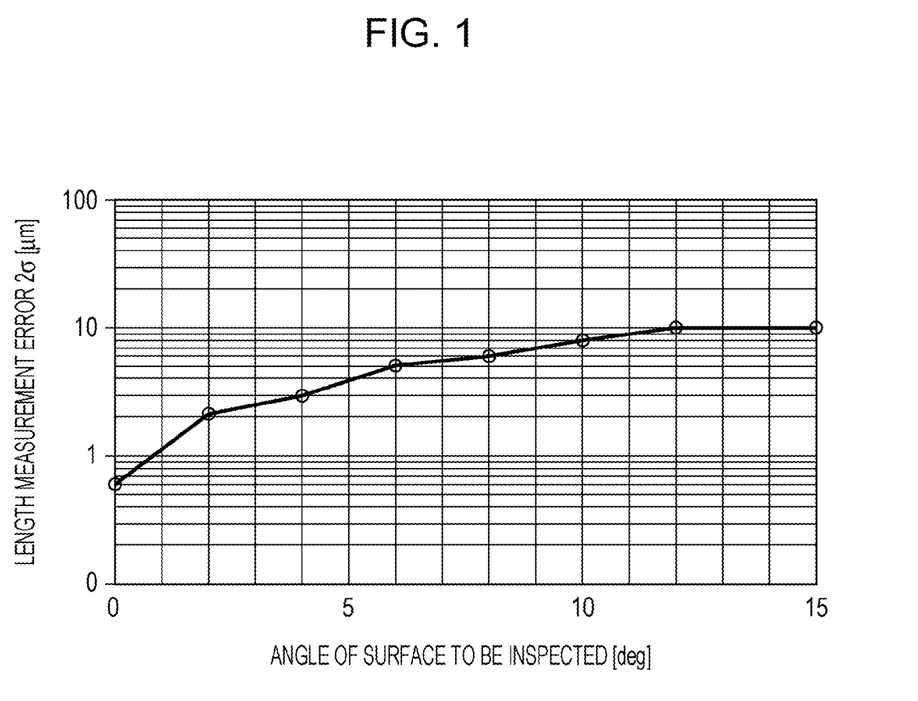
FIG. 1 is a diagram showing an example of a relationship between an inclination angle of a surface to be inspected and a length measurement error.

Here, $\mu$ represents a complex correlation function between two wavelengths, h0 represents a height of the surface to be inspected, and $\Lambda$ represents a synthesized wavelength of the two wavelengths. Further, $\sigma_h$ represents a roughness of the surface to be inspected, s represents an inclination of the surface to be inspected, and a represents a diameter when the surface to be inspected is irradiated by a Gaussian beam. According to Formula 1, when the roughness of the surface to be inspected increases, the correlation of speckle between the two wavelengths decreases. When the inclination of the surface to be inspected increases, the correlation of speckle between the two wavelengths decreases. In particular, influence of the inclination of the surface to be inspected to the correlation of speckle between the two wavelengths is large. FIG. 1 shows an example of a relationship between an inclination angle of the surface to be inspected and a length measurement error. FIG. 1 is a result of a simulation of a length measurement error, in which the surface to be inspected having a roughness of Ra 0.4 μm is illuminated by a spot size of 65 μm and measured by a two-wavelength interferometer which has a synthesized wavelength of 300 μm and receives light of a range of NA 0.02. Here, the length measurement error is a value of $2\sigma$ of length measurement errors of 100 samples of the surface to be inspected. According to FIG. 1, when the inclination of the surface to be inspected is 0°, the length measurement error is as small as 0.6 μm. However, when the inclination of the surface to be inspected is 10°, the length measurement error significantly deteriorates to 8.1 μm. Normally, a speckle pattern in a pupil conjugate plane (a plane related to Fourier transform) with respect to the surface to be inspected when the surface to be inspected is inclined is formed as a pattern in which a speckle pattern when the surface to be inspected is not inclined is shifted (moved in a horizontal direction) in a pupil plane. When the surface to be inspected is inclined, there is a difference between shift amounts of the speckle patterns in a pupil plane of different wavelengths $\lambda_1$ and $\lambda_2$ formed in a pupil conjugate plane of the surface to be inspected, so that the correlation of speckle pattern between the two wavelengths decreases and the degree of accuracy of the length measurement deteriorates. Further, when the inclination angle of the surface to be inspected increases, the difference of the shift amount between the speckle patterns in the pupil plane of the two wavelengths increases, the correlation of speckle pattern between the two wavelengths further decreases and the degree of accuracy of the length measurement significantly deteriorates. As described above, even when a multi-wavelength interferometer is used to measure a rough surface, if the surface to be inspected is inclined, it is difficult to perform an accurate measurement due to decrease of the correlation between the wavelengths.

SUMMARY OF THE INVENTION

According to the present invention, it is possible to provide a measuring apparatus which can reduce degradation of the degree of accuracy of measurement even when the surface to be inspected is inclined.

Further features of the present invention will become apparent from the following description of exemplary embodiments with reference to the attached drawings.

DESCRIPTION OF THE EMBODIMENTS

First Embodiment

Figure 2:
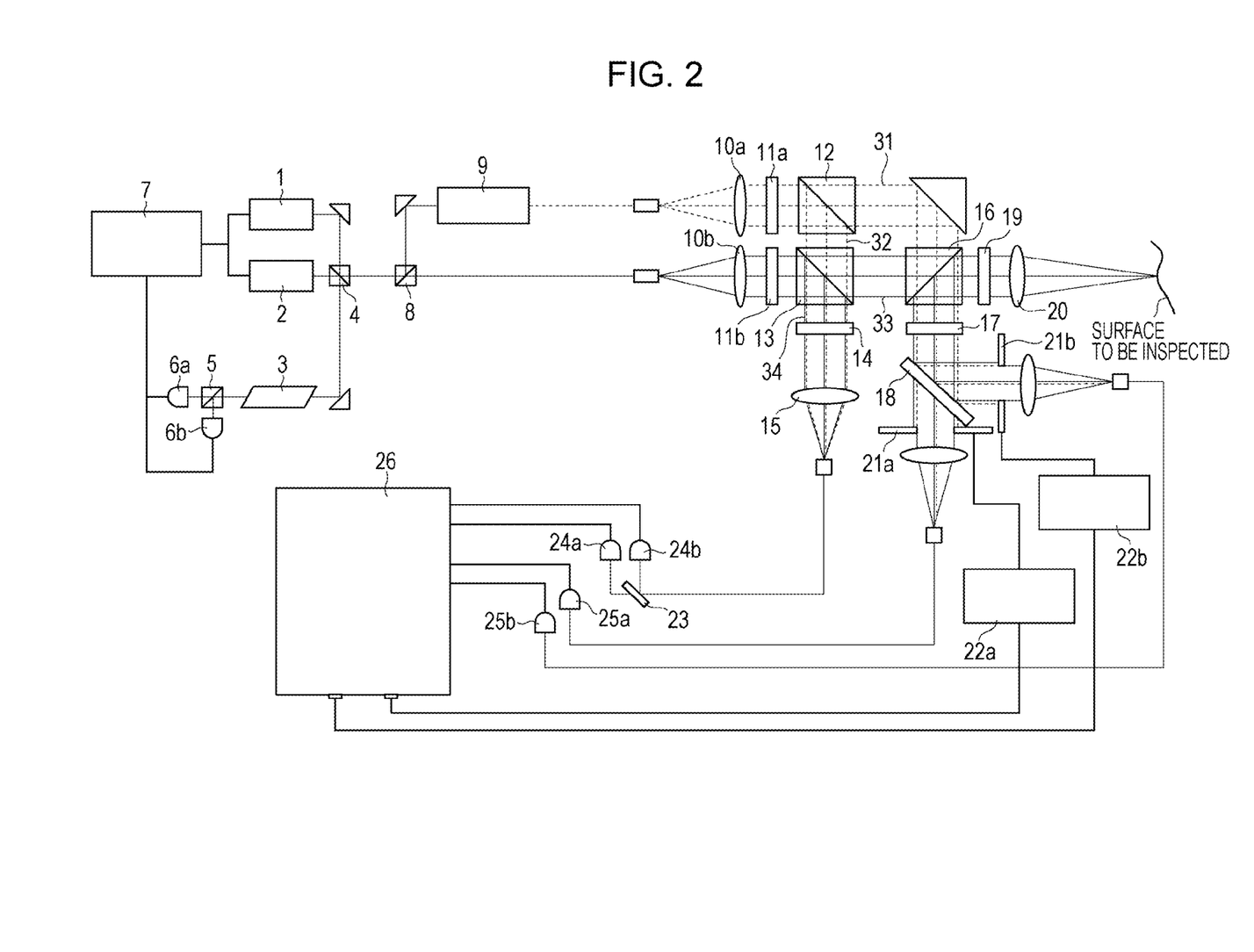
FIG. 2 is a schematic diagram of a measuring apparatus according to a first embodiment.

FIG. 2 is a schematic diagram of a measuring apparatus according to a present embodiment. As shown in FIG. 2, the measuring apparatus of the present embodiment includes a plurality of light sources, an interferometer (optical system) that causes light to be inspected and reference light to interfere with each other and a control device (control unit).

Light emitted from a fixed wavelength laser 1 is divided by a beam splitter 4. A fixed wavelength laser 2 emits light having a wavelength different from that of the light emitted from the fixed wavelength laser 1. The light emitted from the laser 2 enters the beam splitter 4, the light beam axis becomes the same as that of the light emitted from the laser 1, and the light is divided by the beam splitter 4. Here, the laser 1 and the laser 2 use the same type FDB semiconductor laser. In the present embodiment, the laser 1 and the laser 2 are elements separated from each other. However, a plurality of semiconductor lasers may be integrated in one element in the same manner as in a multi-wavelength light source used in optical communication. In this case, there are advantages in cost and size. Further, the lasers are not limited to the DFB laser, but a HeNe laser and the like may be used.

The light divided by the beam splitter 4 passes through a gas cell 3, which is a reference element of wavelength, and then the light is separated into the light emitted from the laser 1 and the light emitted from the laser 2 by a spectroscopic element 5. The light quantities of the light from the laser 1 and the light from the laser 2 after passing through the gas cell 3 are detected by a detector 6a and a detector 6b respectively. A laser control unit 7 performs control so that the wavelength of the laser 1 is stabilized to a wavelength $\lambda_1$ which is an absorption line of the gas cell by using a signal from the detector 6a. The stabilization of the wavelength is performed, for example, by adjusting the wavelength of the laser 1 by the laser control unit 7 so that transmission intensity of the detector 6a is constant. As a wavelength adjusting means, for example, a method of modulating an injection current or a method of controlling temperature is used. Similarly, the laser control unit 7 performs control so that the wavelength of the laser 2 is stabilized to a wavelength $\lambda_2$ which is an absorption line of the gas cell by using a signal from the detector 6b. In the present embodiment, the accuracy of the wavelength is guaranteed by using only the gas cell. However, an etalon may be used instead of the gas cell. Both the gas cell and the etalon may be used.

The other light divided by the beam splitter 4 is further divided into a first light flux and a second light flux by a polarization beam splitter 8. The first light flux enters a frequency (wavelength) shifter 9. The frequency shifter 9 applies a certain amount of frequency shift to a frequency of incident light by an acousto-optic device for each light emitted from the laser 1 and the laser 2. The light emitted from the frequency shifter 9 enters a collimator lens 10a. The second light flux divided by the polarization beam splitter 8 enters a collimator lens 10b. The frequency shifter may be disposed inside an optical path of the second light flux or frequency shifters having different shift amounts may be disposed for both light fluxes.

The first light flux that enters the collimator lens 10a is converted into a parallel light flux by the collimator lens 10a. The parallel light flux passes through a $\lambda/2$ plate 11a and then the parallel light flux is divided into transmitted light 31 and reflected light 32 by a polarization beam splitter 12. The $\lambda/2$ plate 11a adjusts a polarizing direction so that a light quantity of the light flux divided by the beam splitter 12 has a desired branching ratio. The reflected light 32 is adjusted by a $\lambda/2$ plate not shown in FIG. 2 so that the polarizing direction is rotated by 90 degrees. Thereafter, the reflected light 32 passes through a polarization beam splitter 13 and a polarizer 14 and then the reflected light 32 is collected by a collecting lens 15. Thereafter, the reflected light 32 enters a spectroscopic element 23 such as a dichroic mirror.

The second light flux that enters the collimator lens 10b is converted into a parallel light flux by the collimator lens 10b. The parallel light flux passes through a $\lambda/2$ plate 11b and then the parallel light flux is divided into transmitted light 33 and reflected light 34 by a polarization beam splitter 13. The $\lambda/2$ plate 11b adjusts a polarizing direction so that a light quantity of the light flux divided by the beam splitter 13 has a desired branching ratio. The reflected light 34 divided by the polarization beam splitter 13 passes through the polarizer 14, is collected by the collecting lens 15, and enters the spectroscopic element 23.

The spectroscopic element 23 divides the light by letting the light from the laser 1 to pass through and reflecting the light from the laser 2. The light that passes through the spectroscopic element 23 enters the detector 24a and the light reflected by the spectroscopic element 23 enters the detector 24b. The detector 24a detects interference light between the reflected light 32 where a frequency shift is applied to the light of the wavelength $\lambda_1$ and the reflected light 34 of the wavelength $\lambda_1$ and outputs a beat signal (interference signal) corresponding to a frequency difference between the two signals to a control device (computer) 26 as a reference signal. Similarly, the detector 24b detects interference light between the reflected light 32 where a frequency shift is applied to the light of the wavelength $\lambda_2$ and the reflected light 34 of the wavelength $\lambda_2$ and outputs a beat signal corresponding to a frequency difference between the two signals to a control device 26 as a reference signal. Although a configuration is described in which light is separated into reference signals for each wavelength by using the spectroscopic element 23, light may be separated into interference signals for each wavelength by adding different frequency shift amounts to the first light fluxes of the wavelength $\lambda_1$ and the wavelength $\lambda_2$ respectively and separating the interference signal detected by the detector by frequency. In this case, the spectroscopic element is not required and only one detector is used, so that the apparatus configuration is simplified.

On the other hand, the transmitted light 31 divided by the polarization beam splitter 12 is deflected by a mirror and enters a polarization beam splitter 16. The polarization beam splitter 16 lets the transmitted light 31 to pass through as reference light. The transmitted light 33 divided by the polarization beam splitter 13 passes through the polarization beam splitter 16 as light to be inspected. After passing through the polarization beam splitter 16, the transmitted light 33 is circularly polarized by a λ/4 plate 19, converted into converging light by a collecting lens 20, and collected on the surface to be inspected. The light is reflected by the surface to be inspected and then passes through the λ/4 plate 19 again, so that the light becomes linearly polarized light whose polarization plane is rotated 90 degrees from when the light entered the polarization beam splitter 16 before and enters the polarization beam splitter 16 again. Thereafter, the light is reflected by the polarization beam splitter 16. The polarization beam splitter 16 synthesizes the transmitted light 31 that is the reference light and the transmitted light 33 that is the light to be inspected and causes the transmitted light 31 and the transmitted light 33 to interfere with each other. Then the interference light between the reference light and the light to be inspected passes through a polarizer 17 and enters the spectroscopic element 18 such as a dichroic mirror.

The spectroscopic element 18 (spectroscopic unit) divides the light by letting the light from the laser 1 to pass through and reflecting the light from the laser 2. The light that passes through the spectroscopic element 18 passes through an opening of an aperture 21a located at or near a position of pupil conjugate (pupil plane) with respect to the surface to be inspected (a position related to Fourier transform) and enters a detector 25a that detects the interference light. The light reflected by the spectroscopic element 18 passes through an opening of an aperture 21b located at or near a position of pupil conjugate (pupil plane) with respect to the surface to be inspected and enters a detector 25b that detects the interference light. The detectors 25a and 25b detect the interference light between the light to be inspected and the reference light and output a beat signal corresponding to a frequency difference between the two light fluxes to the control device (computer) 26 as a measurement signal. The control device calculates a distance based on the measurement signal. The phase of the measurement signal is different from the phase of the reference signal. Therefore, a phase with respect to the reference signal may be obtained as a measurement value of the phase of the measurement signal. The phase of the measurement varies depending on an optical path length difference between the light to be inspected and the reference light.

At least one of the aperture 21a and the aperture 21b disposed between the spectroscopic element and the detector is disposed movably in any direction in a plane perpendicular to the optical axis. For example, the aperture is disposed on a movable stage and the stage may be moved by a drive control device 22a or 22b including an actuator and a control device of the stage. In other words, the aperture (optical member) is provided so that the aperture guides the light from the spectroscopic element to the detector through the opening of the aperture and a position of a light guide portion that guides the light from the spectroscopic element to the detector can be adjusted by changing the position of the aperture.

Figure 3:
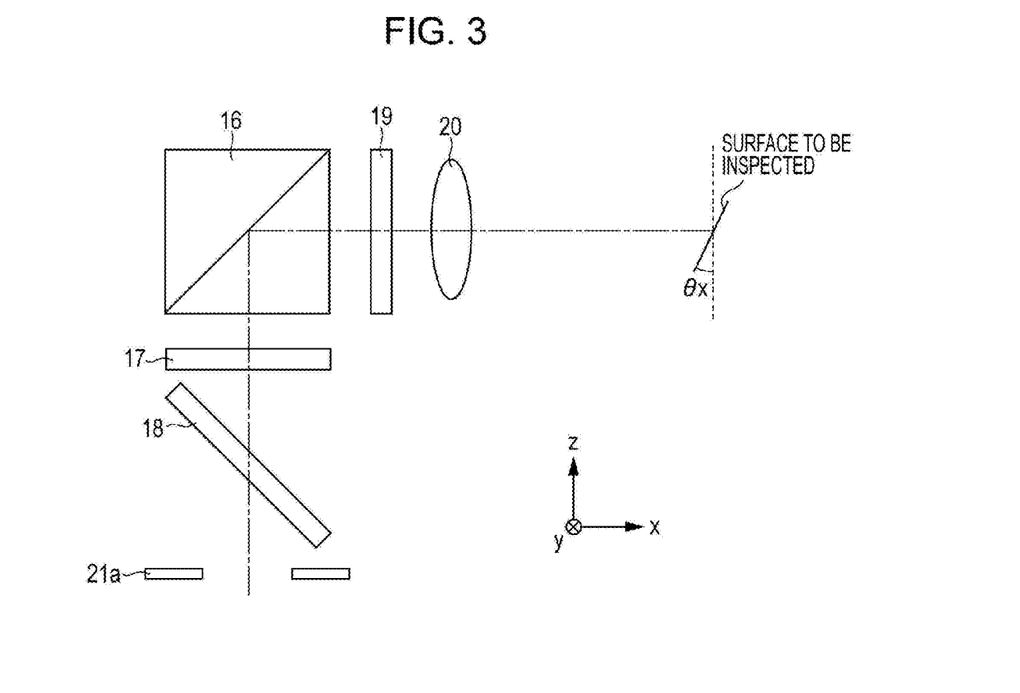
FIG. 3 is a diagram for explaining an inclination angle of the surface to be inspected.

A speckle pattern when the surface to be inspected is inclined with respect to a surface perpendicular to the optical axis of the interferometer (a direction of incident light) is formed as a pattern in which a speckle pattern when the surface to be inspected is not inclined is shifted (moved in a horizontal direction) in a pupil plane. FIG. 3 shows a relationship between an inclination angle of the surface to be inspected in an xz cross section and a partial configuration of the interferometer. The optical axis of the interferometer is indicated by a dashed-dotted line. The optical axis of the interferometer is bent by the polarization beam splitter 16. The light that enters the surface to be inspected in the optical axis direction of the interferometer is reflected by the surface to be inspected, deflected in the z direction by the polarization beam splitter 16, and enters the opening of the aperture 21a. When the surface to be inspected is inclined by an angle θx with respect to a surface perpendicular to the optical axis of the interferometer (the yz plane indicated by a dotted line in FIG. 3) in a range in which the light to be inspected enters, the speckle pattern shifts in the x direction in a pupil plane where the aperture 21a is located (a surface perpendicular to the optical axis of the interferometer, the xy plane shown in FIG. 3).

Figure 4:
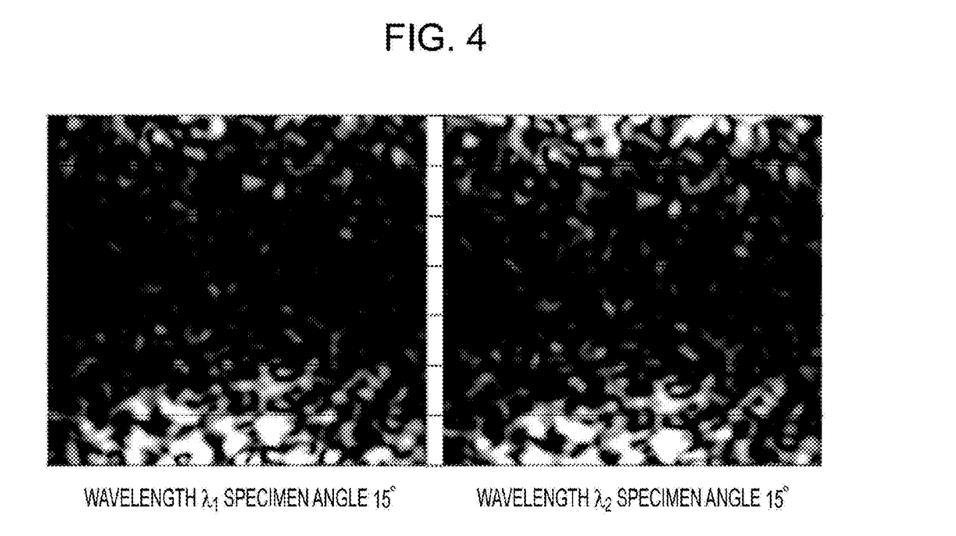
FIG. 4 is a diagram for explaining a shift amount of a speckle pattern.

FIG. 4 shows a speckle pattern of the light of the wavelength $\lambda_1$ and a speckle pattern of the light of the wavelength $\lambda_2$ when the inclination angle of the surface to be inspected is 15 degrees. As shown in FIG. 4, when the surface to be inspected is inclined, there is a difference between shift amounts of the speckle patterns of different wavelengths $\lambda_1$ and $\lambda_2$ formed in a pupil conjugate plane (pupil plane of the interferometer) with respect to the surface to be inspected. Therefore, the correlation between the speckle patterns of the two wavelengths decreases and an error occurs in the phase difference between measurement signals of the two wavelengths, so that the degree of accuracy of the length measurement decreases. Further, the larger the angle of the inclination of the surface to be inspected, the larger the difference between the shift amounts of the speckle patterns of the two wavelengths in the pupil plane.

A relationship between the inclination of the surface to be inspected and the shift amount between the speckle patterns of the two wavelengths is represented by Formula 2.

$$\Delta L_x = 2f \times \tan(\theta_x) \times \left(\frac{\lambda_1}{\lambda_2} - 1\right)$$

$$\Delta L_y = 2f \times \tan(\theta_y) \times \left(\frac{\lambda_1}{\lambda_2} - 1\right)$$

Formula 2

Here, when directions perpendicular to the optical axis of the interferometer in the pupil plane are defined as x and y, $\Delta L_x$ is a shift amount in the x direction in the pupil plane and $\Delta L_y$ is a shift amount in the y direction perpendicular to the x direction in the pupil plane. The f is a focal length of a light-receiving optical system (optical system from the surface to be inspected to the pupil plane) that receives the reflected light from the surface to be inspected. The θx is an inclination angle of the surface to be inspected with respect to a first direction (the z direction shown in FIG. 3) and an inclination angle of the surface to be inspected with respect to the z direction in the xz cross section shown in FIG. 3. The θy is an inclination angle of the surface to be inspected with respect to a second direction perpendicular to the first direction (the y direction shown in FIG. 3) and an inclination angle of the surface to be inspected with respect to the y direction in the xy cross section in the coordinate system shown in FIG. 3.

Therefore, to reduce the length measurement error caused by the shift of the speckle pattern, information of inclinations of the surface to be inspected is obtained in advance. Then, the position of the light guide portion that guides the light from the spectroscopic element 18 to the detector (a range in which the interference light passes through in the pupil plane) may be changed between the two wavelengths on the basis of the shift amount of the speckle pattern between the two wavelengths calculated by using Formula 2.

Figure 5:
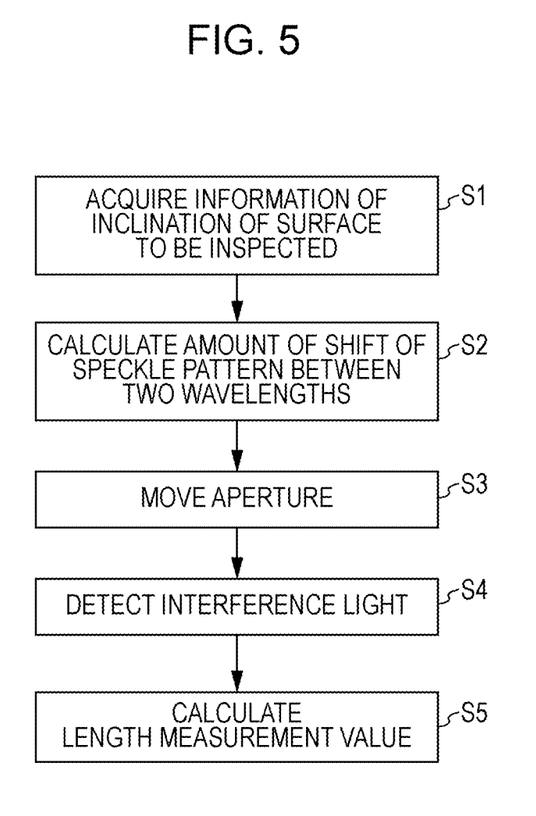
FIG. 5 is a diagram showing a flow of calculating a length measurement value according to the first embodiment.

Next, a length measurement value calculation method of the present embodiment will be described. FIG. 5 shows a length measurement value calculation flow in the control device 26. In S1, the control device 26 acquires information related to inclination such as the inclination angle of the surface to be inspected and the like. The information of the inclination of the surface to be inspected can be obtained from, for example, information of a set orientation of the surface to be inspected (orientation of the stage that supports the surface to be inspected). Also, the information can be obtained by using information of a design drawing or the like that shows the shape and the size of the surface to be inspected in addition to the set orientation. Further, the information of the inclination may be obtained by measuring the inclination angle of the surface to be inspected by using a measuring apparatus other than the measuring apparatus of the present embodiment. Further, although there is an error, the inclination angle of the surface to be inspected may be calculated from the shape of the surface to be inspected, which is obtained by fixing the two apertures to a datum point in the measuring apparatus of the present embodiment, setting the positions of the light guide portions to the same position with respect to each divided interference light, and measuring the shape of the surface to be inspected in advance. The control device 26 stores the obtained information of the inclination of the surface to be inspected.

Next, in S2, the control device 26 calculates shift amounts ΔLx and ΔLy of the speckle pattern between the two wavelengths by using Formula 2 by using the stored information of the inclination of the surface to be inspected. Then, the control device 26 moves at least one of the apertures 21a and 21b on the basis of the calculated shift amounts (S3).

First, the central position of the light flux (optical axis) in the pupil plane when the surface to be inspected is not inclined with respect to a surface perpendicular to the optical axis of the interferometer is defined as a datum point (origin). The control device 26 determines that a target position of the aperture 21a is the datum point and controls the drive control device 22a to position the aperture 21a to the datum point. For example, the control device 26 can perform the positioning by determining that the center of the opening of the aperture (light guide portion) is the position of the aperture. Also, the control device 26 determines that the target position of the aperture 21b is (ΔLx, ΔLy) and controls the drive control device 22b to move the aperture 21b to a position (ΔLx, ΔLy) away from the datum point and position the aperture 21b. In this way, the aperture is positioned in order to shift the position of the light guide portion that guides the light from the spectroscopic element to the detector between the two wavelengths and correct the error caused by the difference between the shift amounts of the speckle patterns of the two wavelengths.

The movement of the aperture is not limited to the above movement, but the aperture 21a may be arranged to be fixed without using the drive control device 22a. For example, the target position of the aperture 21a is set to ΔLx/2, ΔLy/2, the target position of the aperture 21b is set to −ΔLx/2, −ΔLy/2, and the apertures are moved so that the apertures are positioned at each target position, and thus the apertures are relatively shifted by ΔLx, ΔLy. In this case, the shift amount may be halved, so that the measurement light flux can be small, and further it is possible to reduce a movable range of the stage on which the aperture is mounted. Therefore, there is an advantage that the measurement optical system can be downsized.

Next, the detectors 25a and 25b detect the interference light that passes through the opening of the apertures (S4).

The detector 25a detects a beat signal of the light to be inspected and the reference light related to the wavelength $\lambda_1$. The detector 25b detects a beat signal of the light to be inspected and the reference light related to the wavelength $\lambda_2$. The interference light (reference signal) is acquired by using the detectors 24a and 24b. The signals outputted from the detectors are inputted into the control device 26.

Next, the control device 26 obtains a phase ϕ1 of the beat signal related to the wavelength $\lambda_1$ detected by the detector 25a and a phase ϕ2 of the beat signal related to the wavelength $\lambda_2$ detected by the detector 25b. Then the control device 26 calculates a length measurement value L by using the phases by Formula 3 (S5).

$$L = \frac{\Lambda}{2}(\varphi_1 - \varphi_2) \qquad \text{Formula 3}$$

Here, Λ is a synthesized wavelength of $\lambda_1$ and $\lambda_2$ ($\lambda_1\lambda_2/|\lambda_1-\lambda_2|$). Therefore, the control device 26 calculates the length measurement value L by using the synthesized wavelength and a phase difference between the two wavelengths. The length measurement value corresponds to an optical path length difference between the reference light and the light to be inspected and is represented as a distance to the surface to be inspected and a position of the surface to be inspected. Further, other physical amounts may be obtained on the basis of the length measurement value. For example, when the surface to be inspected is mounted on a stage movable in an XY plane, the measuring apparatus can be applied to a shape measurement in which information of a surface shape of the surface to be inspected is obtained from the length measurement values at a plurality of positions on the surface to be inspected. Instead of the movable stage, a galvanometer mirror may be disposed between the interferometer and the surface to be inspected.

In this way, information of the inclination of the surface to be inspected is acquired in advance, the aperture is positioned according to the difference of the shift amount between the speckle patterns of the two wavelengths, and the interference light having a high correlation between the two wavelengths is detected. Therefore, it is possible to reduce the measurement error caused by the shift of the speckle pattern between the two wavelengths and a highly accurate measurement can be performed.

In a method of reducing the speckle influence by the incoherent averaging described in Patent Document 2, even when one point is measured, a processing time for acquiring a large amount of data and averaging spatial or temporal changes of the speckle pattern is required, so that the measurement time is long. According to the present embodiment, the incoherent averaging is not performed, so that the measurement can be performed faster than the invention described in Patent Document 2. In the invention described in Patent Document 1, an aperture and a pin hole are moved and only a position of a maximum light quantity corresponding to specular reflected light from the surface to be inspected is detected, so that the correlation of the speckle pattern between the wavelengths is not improved.

Second Embodiment

In the present embodiment, a DMD (Digital Mirror Device) is used instead of the aperture. A configuration different from that of the first embodiment will be described and the description of the same configuration will be omitted.

Figure 6:
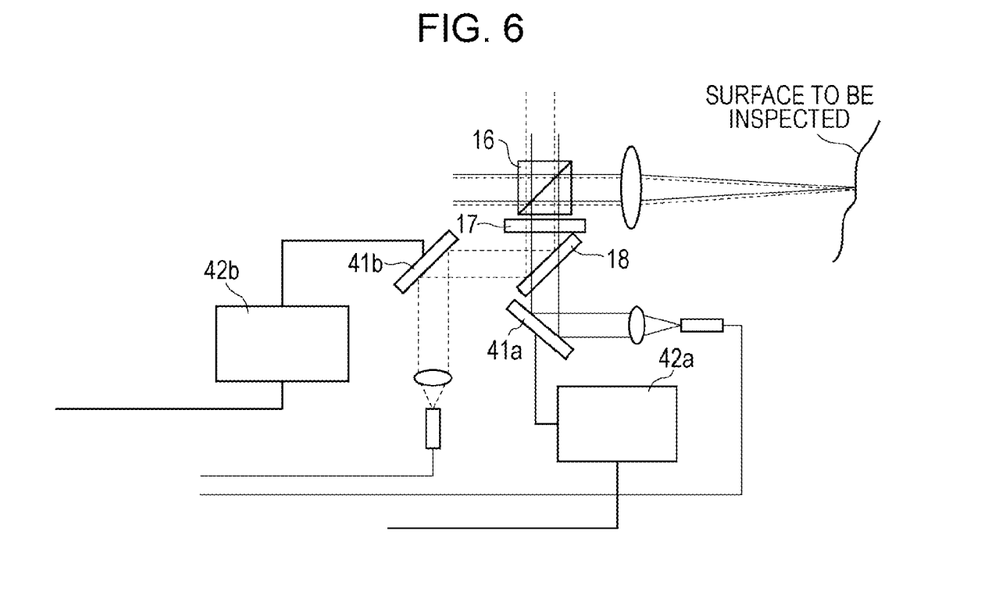
FIG. 6 is a diagram showing a part of a measuring apparatus according to a second embodiment.

FIG. 6 shows a configuration of a measuring apparatus of a portion after the light passes through the polarization beam splitter 16.

The light that passes through the polarization beam splitter 16 passes through the polarizer 17 and enters the spectroscopic element 18. The spectroscopic element 18 divides the light by letting the light from the laser 1 to pass through and reflecting the light from the laser 2. The light that passes through the spectroscopic element 18 enters a DMD (reflecting optical member) 41a disposed at or near a position of pupil conjugate with respect to the surface to be inspected and the light reflected by the DMD 41a is detected by the detector 25a. The light reflected by the spectroscopic element 18 enters a DMD 41b disposed at or near a position of pupil conjugate with respect to the surface to be inspected and the light reflected by the DMD 41b is detected by the detector 25b.

Figure 7:
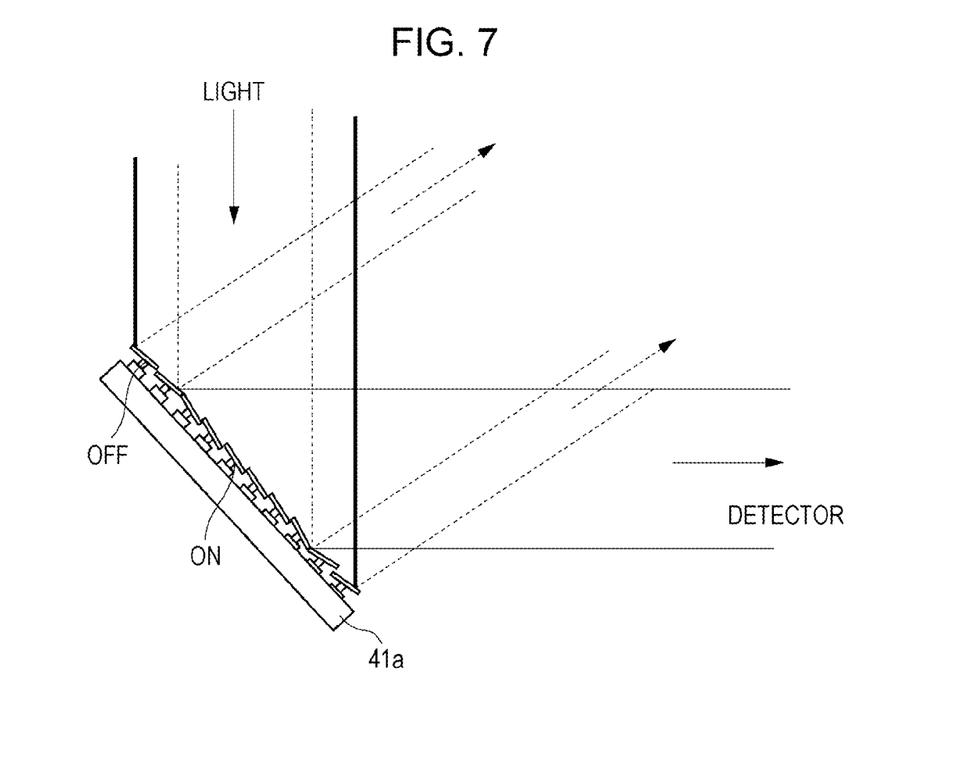
FIG. 7 is a diagram for explaining an operation of a DMD.

The DMD is an optical element in which micro-mirror surfaces are two-dimensionally arranged. The size of a single pixel of the micro-mirror surface is, for example, ten and several μm and several hundred thousand mirror surfaces are arranged. When driving an electrode provided below a mirror surface of each pixel, the mirror surface can be inclined by ±12° around a torsion axis by "ON" and "OFF" and a light projection direction can be controlled individually for each pixel. As shown in FIG. 7, it is controlled so that a pixel in an "ON" state reflects the incident light in a direction to the detector so that the light is detected by the detector and a pixel in an "OFF" state reflects the incident light in a direction not to the detector so that the light is not detected by the detector. In this way, the position (range) of the light guide portion which reflects the light coming from the spectroscopic element by the DMD and guides the light to the detector is determined.

In the present embodiment, the position of the light guide portion which reflects the light coming from the spectroscopic element by the DMD and guides the light to the detector is calculated on the basis of the shift amount ΔLx, ΔLy of the speckle pattern between the two wavelengths calculated by using Formula 2 described above, and the DMDs 41a and 41b are controlled on the basis of the position. Drive control devices 42a and 42b are provided for the DMDs 41a and 41b and ON and OFF of each pixel is controlled by the drive control devices.

Figure 8:
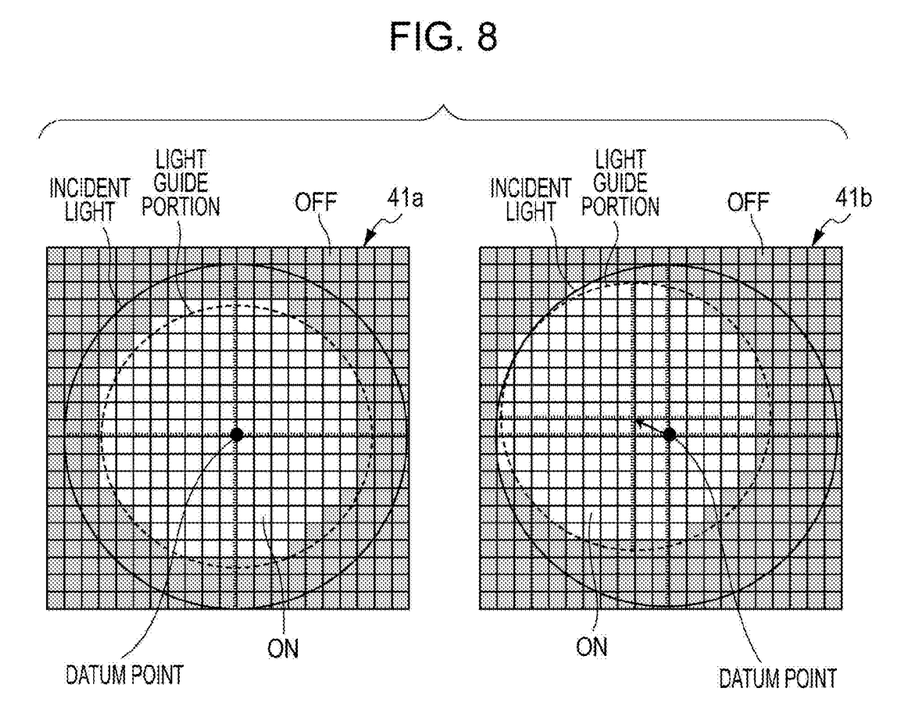
FIG. 8 is a diagram for explaining an operation of the DMD.

FIG. 8 shows states of ON and OFF of the DMDs 41a and 41b. As shown in FIG. 8, a datum point (origin) is defined in the same manner as in the first embodiment and the light guide portion in which the DMD41a reflects the light coming from the spectroscopic element and guides the light to the detector is an area inside a predetermined circle around the datum point (inside a circle indicated by a dashed line). The pixels shown in white in the light guide portion are set in the ON state by the drive control device 42a and the other pixels shown in gray are set in the OFF state. On the other hand, the light guide portion in which the DMD41b reflects the light coming from the spectroscopic element and guides the light to the detector is an area inside a predetermined circle around a point (ΔLx, ΔLy) which is shifted from the datum point by the shift amount. The pixels shown in white in the area are set in the ON state by the drive control device 42b and the other pixels shown in gray are set in the OFF state. The adjustment of the light guide portion is not limited to the above example, but the center position may be relatively shifted by the shift amount in the same manner as in the first embodiment.

In this way, the DMD is controlled according to the difference of the shift amount between the speckle patterns of the two wavelengths, so that the interference light having a high correlation between the two wavelengths is detected. Therefore, it is possible to reduce the measurement error caused by the shift of the speckle pattern between the two wavelengths and a highly accurate measurement can be performed.

The DMD can perform ON/OFF switching control of submillisecond, so that the measurement can be performed quickly. Not only the DMD, but also elements that can perform two-dimensional ON/OFF switching, such as a liquid crystal shutter and a spatial light modulator, may be used.

While the embodiments of the present invention have been described, the present invention is not limited to the embodiments, but may be variously changed and modified without departing from the scope of the invention. For example, in the above embodiments, a heterodyne interferometer is described. However, the present invention can be applied to a case in which a rough surface is measured by a multi-wavelength homodyne interferometer. While a two-wavelength interferometer is exclusively described in the embodiments, a multi-wavelength interferometer that uses three or more different wavelengths may be used. The present invention may also be applied to a multi-wavelength interferometer that can measure an absolute length by performing wavelength scanning on one of a plurality of wavelengths.

When the position or the shape of the surface to be inspected is measured, it is possible to process the surface to be inspected into a desired surface shape agreed with design values by using a result of the measurement to manufacture an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-275096 filed Dec. 15, 2011, which is hereby incorporated by reference herein in its entirety.

What is claimed is:

1. A measuring apparatus for measuring a position or a shape of a surface to be inspected, the measuring apparatus comprising:
    a multi-wavelength interferometer that uses a plurality of light fluxes including a light flux of a first wavelength and a light flux of a second wavelength different from the first wavelength; and
    a control unit that obtains a position or a shape of the surface to be inspected by using interference light signals detected by the multi-wavelength interferometer,
    wherein the multi-wavelength interferometer includes
        an optical system that causes an inspection light, which impinges on the surface to be inspected and is reflected by the surface to be inspected, and a reference light to interfere with each other with respect to the light flux of the first wavelength and the light flux of the second wavelength,
        a spectroscopic unit that divides interference light between the inspection light and the reference light into each wavelength of the first wavelength and the second wavelength,
        a first detector that detects the interference light of the first wavelength divided by the spectroscopic unit,
        a second detector that detects the interference light of the second wavelength divided by the spectroscopic unit,
        a first optical member including a first light guide portion that guides the interference light of the first wavelength to the first detector, and a second optical member including a second light guide portion that guides the interference light of the second wavelength to the second detector, wherein the control unit obtains a shift amount of a speckle pattern on a pupil plane between the first wavelength and the second wavelength of the interference light by using information related to inclination of the surface to be inspected and controls the first optical member and the second optical member to shift at least one of a position of the first light guide portion and a position of the second light guide portion on the basis of the obtained shift amount of the speckle pattern.

2. The measuring apparatus according to claim 1, wherein the optical member is an aperture and the light guide portion is an opening of the aperture, and the control unit controls a position of the opening of the aperture by using the information related to the inclination of the surface to be inspected.

3. The measuring apparatus according to claim 1, wherein the optical member is an element in which a plurality of micro-mirror surfaces are two-dimensionally arranged and the light guide portion is a part of the micro-mirror surfaces which reflects light from the spectroscopic unit to guide the light to the detector.

4. The measuring apparatus according to claim 1, wherein the information related to inclination of the surface to be inspected is an inclination angle of the surface to be inspected.

5. The measuring apparatus according to claim 1, wherein the control unit acquires the information related to inclination of the surface to be inspected from a shape of the surface to be inspected, which is measured by the measuring apparatus by setting a position of the light guide portion at the same position with respect to each divided interference light.

6. The measuring apparatus according to claim 1, wherein the multi-wavelength interferometer is a heterodyne interferometer.

7. A method for manufacturing an object, comprising:

a step of measuring a surface to be inspected of the object by using the measuring apparatus according to claim 1; and a step of processing the surface to be inspected by using a result of the measurement.

8. The measuring apparatus according to claim 1, wherein the optical system causes the inspection light which impinges on a rough surface as the surface to be inspected and is reflected by the rough surface, and the reference light to interfere with each other.

9. The measuring apparatus according to claim 1, wherein the shift amount ΔL of the speckle pattern in a pupil plane between wavelengths of $\lambda_1$ and $\lambda_2$ is expressed by the following equation, $$\Delta L = 2f \times \tan(\theta) \times \left(\frac{\lambda_1}{\lambda_2} - 1\right)$$

where f is a focal length of a light-receiving optical system that receives the reflected light from the surface to be inspected, θ is an inclination angle of the surface to be inspected.

10. The measuring apparatus according to claim 1, wherein the first light guide portion and the second light guide portion include a position on an optical axis of the multi-wavelength interferometer.

11. The measuring apparatus according to claim 1, wherein the control unit controls one of the first optical member and the second optical member to shift one of the position of the first light guide portion and the position of the second light guide portion by the shift amount of the speckle pattern.

* * * * *